(12) United States Patent
Froemming et al.

(10) Patent No.: US 8,370,606 B2
(45) Date of Patent: Feb. 5, 2013

(54) SWITCHING DATA POINTERS BASED ON CONTEXT

(75) Inventors: Benjamin Francis Froemming, San Jose, CA (US); Emil Lambrache, Campbell, CA (US)

(73) Assignee: Atmel Corporation, San Jose, CA (US)

( * ) Notice: Subject to any disclaimer, the term of this patent is extended or adjusted under 35 U.S.C. 154(b) by 949 days.

(21) Appl. No.: 11/687,474

(22) Filed: Mar. 16, 2007

(65) Prior Publication Data

US 2008/0229067 A1    Sep. 18, 2008

(51) Int. Cl.
*G06F 9/00* (2006.01)
(52) U.S. Cl. ...................................... 712/220
(58) Field of Classification Search .................. 712/208, 712/209, 220, 225
See application file for complete search history.

(56) References Cited

U.S. PATENT DOCUMENTS

| | | | |
|---|---|---|---|
| 5,241,492 A | 8/1993 | Girardeau, Jr. | |
| 5,422,805 A | 6/1995 | McIntyre et al. | |
| 5,666,300 A | 9/1997 | Adelman et al. | |
| 5,793,661 A | 8/1998 | Dulong et al. | |
| 5,968,162 A | 10/1999 | Yard | |
| 6,032,248 A | 2/2000 | Curry et al. | |
| 6,049,858 A | 4/2000 | Kolagotla et al. | |
| 6,182,140 B1 | 1/2001 | Feig et al. | |
| 6,219,797 B1 | 4/2001 | Liu et al. | |
| 6,317,822 B1 | 11/2001 | Padwekar | |
| 6,434,690 B1 | 8/2002 | Ohsuga et al. | |
| 6,691,219 B2 | 2/2004 | Ma et al. | |
| 6,728,739 B1 | 4/2004 | Kobayashi et al. | |
| 6,957,321 B2 * | 10/2005 | Sheaffer | 712/209 |
| 7,129,862 B1 | 10/2006 | Shirdhonkar et al. | |
| 2001/0023489 A1 | 9/2001 | Liu et al. | |
| 2002/0103978 A1 | 8/2002 | Ma et al. | |
| 2002/0133687 A1 | 9/2002 | Little et al. | |
| 2002/0154769 A1 | 10/2002 | Petersen et al. | |
| 2003/0120938 A1 | 6/2003 | Mullor | |
| 2004/0006584 A1 | 1/2004 | Vandeweerd | |
| 2005/0069138 A1 | 3/2005 | De Jong | |
| 2006/0200650 A1 | 9/2006 | Froemming et al. | |
| 2006/0212679 A1 | 9/2006 | Alfano et al. | |

FOREIGN PATENT DOCUMENTS

WO    WO99/01815    1/1999

OTHER PUBLICATIONS

PCT International Search Report corresponding to PCt/US2007/075646 dated Jan. 10, 2008, 4 pages.
Dallas Semiconductor MAXIM Application Note 605: "Data Pointer Decrement Feature Simplifies Copy Operation for Overlapping Memory Buffers", Apr. 3, 2002.
Dallas Semiconductor MAXIM Application Note 2035: "The Fast 8051 Microcontroller: Leading the Way in Growth and Innovation", May 14, 2003.

(Continued)

*Primary Examiner* — David Huisman
(74) *Attorney, Agent, or Firm* — Fish & Richardson P.C.

(57) ABSTRACT

Apparatus and methods for quickly switching active context between data pointer registers are disclosed. The apparatus can include a first register operable for storing a first data pointer and a second register operable for storing a second data pointer. A configuration register can provide a first signal specifying either the first or the second data pointer as an active data pointer. An instruction decoder can receive a data pointer instruction and output a second signal. The first and second signals can be independent from one another. Decoding logic coupled to the logic devices can output one of the first or second data pointers as the active data pointer in response to the first and second signals.

17 Claims, 11 Drawing Sheets

OTHER PUBLICATIONS

Dallas Semiconductor MAXIM Application Note 603: "Implementing a Serial Port FIFO using Dual Data Pointers", Mar. 15, 2002.

Groszschaedl, J., "Instruction Set Extension for Long Integer Modulo Arithmetic on RISC-Based Smart Cards", *Computer Architecture and High Performance Computing*, 2002, 14th Symposium held Oct. 28-30, 2002, pp. 13-19.

International Search Report in corresponding PCT Application No. PCT/US08/57107 dated Aug. 15, 2008, 3 pages.

Intel, "MCS® MicroController Family User's Manual," Feb. 1994, 144 pages.

USPTO Notice of Allowance for U.S. Appl. No. 11/687,264 dated Dec. 14, 2009, 8 pages.

* cited by examiner

SWITCHING DATA POINTERS BASED ON CONTEXT

RELATED APPLICATIONS

The subject matter of this patent application is related to co-pending and jointly-owned U.S. patent application Ser. No. 11/687,264, for "Microcontroller With Low-Cost Digital Signal Processing Extensions," filed Mar. 16, 2007, which patent application is incorporated by reference herein in its entirety.

TECHNICAL FIELD

The disclosed implementations are generally related to integrated circuits.

BACKGROUND

In 1980, Intel® Corporation released the first MCS-51 microcontroller (hereinafter, also referred to as the "8051 microcontroller"). The 8051 microcontroller includes a single 16-bit data pointer register (DPTR) for performing indirect addressing on data memory or indexed addressing on program memory. The 8051 microcontroller utilized an MCS-51 instruction set, which included six instructions that directly referenced the data pointer as an operand. The six instructions are shown in Table I below.

TABLE I

MCS-51 Data Pointer Instructions

| Data Pointer Instructions | Opcode |
|---|---|
| MOV DPTR, #immediate 16 | 90h |
| INC DPTR | A3h |
| MOVC A, @A+DPTR | 93h |
| MOVX A, @DPTR | E0h |
| MOVX @DPTR, A | F0h |
| JMP @A+DPTR | 73h |

The 8051 microcontroller supports up to 64 kilobytes of main data memory. The memory can be accessed in a load-store manner using the MOVX A, @DPTR and MOVX @DPTR, A instructions, shown in Table I above. The use of a single data pointer can create a bottleneck when accessing data memory. For example, a block copy routine, which copies data from one location to another, requires several manipulations to maintain pointers to both the source and destination addresses.

Since 1980, several companies have produced 8051-based microcontrollers which include a second data pointer to help alleviate the bottleneck problem described above. Because the MCS-51 instruction set does not include instructions for supporting multiple data pointers directly, some of these conventional microcontrollers used a control bit called Data Pointer Select (DPS) in a configuration register to select between registers in a dual data pointer register configuration. For example, setting DPS=0 could be used to select a first data pointer register as active, and setting DPS=1 could be used to select a second data pointer register as active. Typically, all six data pointer instructions in the MCS-51 instruction set were affected by the DPS setting.

Dual Data Pointer Configuration Without Fast Context Switching

Figure 1:
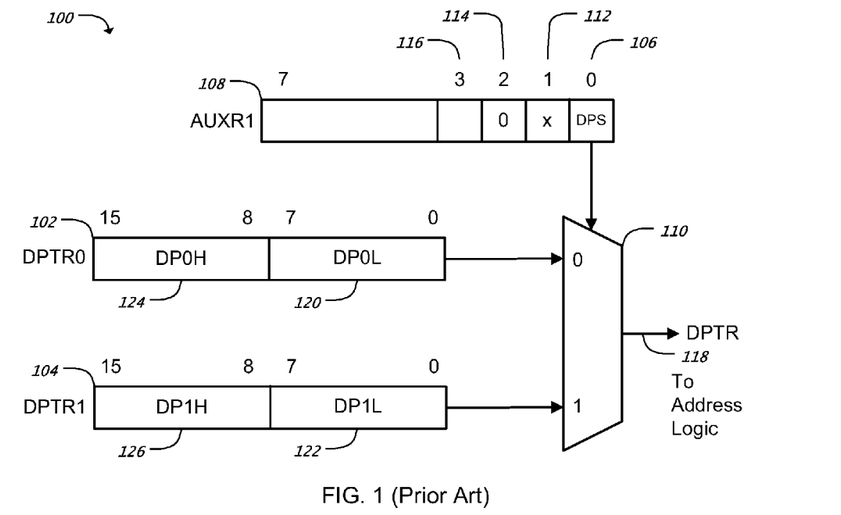
FIG. 1 is a block diagram illustrating a device including a dual data pointer configuration without fast context switching.

FIG. 1 is a block diagram illustrating a conventional dual data pointer configuration 100. The configuration 100 can be included in a central processing unit (CPU) of an 8051-based microcontroller that utilizes the MCS-51 instruction set. The configuration 100 includes dual data pointer registers 102 (DPTR0) and 104 (DPTR1). The dual data pointer registers 102, 104, include respective low bytes 120, 122 (DP0L, DP1L) and respective high bytes 124, 126 (DP0H, DP1H).

A control bit 106 (DPS) in a configuration register 108 (AUXR1) is used to select between registers 102 and 104. The control bit 106 and registers 102 and 104, are coupled to a switch 110 (e.g., n:1 digital multiplexer), which can be configured to output either the contents of register 102 or register 104 as an active data pointer 118 (DPTR) based on the value of the control bit 106. For example, when the control bit 106 is equal to logic 0, the contents of register 102 can be output as the active data pointer 118. When the control bit 106 is equal to logic 1, the contents of register 104 can be output as the active data pointer 118. The active data pointer 118 can be coupled to address logic for performing indirect addressing on data memory or indexed addressing on program memory.

When using the configuration 100, an additional instruction must be inserted in the program code to toggle the control bit 106 when a switch between registers 102 and 104 is required. This additional instruction is typically a two-byte INC direct instruction targeting the configuration register 108. To facilitate the toggling, the control bit 106 can be the least significant bit of the configuration register 108, and a second bit 112 or third bit 114 in the configuration register 108 can be hard wired to logic 0. In the example shown, the second bit 112 is not used (a "don't care") and the third bit 114 is hard wired to logic 0. In this configuration, the configuration register 108 can be incremented with the two-byte INC direct instruction. Each increment instruction will toggle the control bit 108 and increment the total count contained in the configuration register 108. The count can be incremented by a carry out bit propagating to the next highest bit in the configuration register 108. However, hard wiring of the third bit 114 of the configuration register 108 to logic 0 can block the propagation of any carry out from the lower bits of the configuration register 108 (e.g., control bit 106 and second bit 112) into the higher bits (e.g., bit 116) of the configuration register 108. Therefore, the control bit 106 can be toggled without affecting the upper bits of the configuration register 108.

Below is an example of a block copy routine, in assembly language code utilizing an MCS-51 based instruction set, which can be implemented using the configuration 100.

```
        MOV AUXR1, #0           ; initialize AUXR1
        MOV DPTR, #(source)     ; load source address
        INC AUXR1               ; toggle DPS to 1
        MOV DPTR, # (destination) ; load dest. Address
        INC AUXR1               ; toggle DPS to 0
        MOV R4, #block-size     ; # of bytes to copy
        CALL COPY               ; call copy routine
COPY:
        MOVX A, @DPTR           ; fetch byte from RAM
        INC DPTR                ; advance source pointer
        INC AUXR1               ; toggle DPS to 1
        MOVX @DPTR, A           ; store data to RAM
        INC DPTR                ; advance dest. Pointer
        INC AUXR1               ; toggle DPS to 0
        DJNZ R4, COPY           ; continue if not done
        RET                     ; else, return
```

While the example conventional program code listed above helps alleviate bottlenecks found in a single data pointer configuration, the frequent use of the INC AUXR1 instruction increases program code size and complexity, which results in slower processor performance due to the additional processor cycles needed to perform the INC AUXR1 operation each time a switch between data pointer registers is required.

SUMMARY

The disclosed implementations include an apparatus and method for implementing multiple data pointer registers in a device and a means of quickly switching the active context between the data pointer registers. In some implementations, the apparatus and method can be incorporated into a microcontroller (e.g., an 8051-based microcontroller) that operates on the MCS-51 instruction set with 16-bit addresses and 8-bit data.

In some implementations, a device includes a first data pointer register operable for storing a first data pointer and a second data pointer register operable for storing a second data pointer. A configuration register is operable for providing a first signal specifying either the first data pointer or the second data pointer as an active data pointer. An instruction decoder is operable to receive a first type of data pointer instruction and outputting a second signal indicative of the first type of data pointer instruction. Decoding logic is coupled to the first and second data pointer registers, the configuration register and the instruction decoder. The decoding logic is operable for outputting one of the first or second data pointer as the active data pointer in response to the first signal and the second signal, where the one is not indicated by the first signal.

In some implementations, a method of controlling data pointers in a device includes: storing a first data pointer; storing a second data pointer; providing a first signal specifying either the first data pointer or the second data pointer as an active data pointer; providing a second signal in response to detection of a data pointer instruction of a first type; and outputting one of the first or second data pointer as the active data pointer in response to the first signal and the second signal, where the one is not indicated by the first signal.

Other implementations are disclosed that are directed to devices, systems and methods.

DETAILED DESCRIPTION

Dual Data Pointer Configuration with Fast Context Switching

Figure 2:
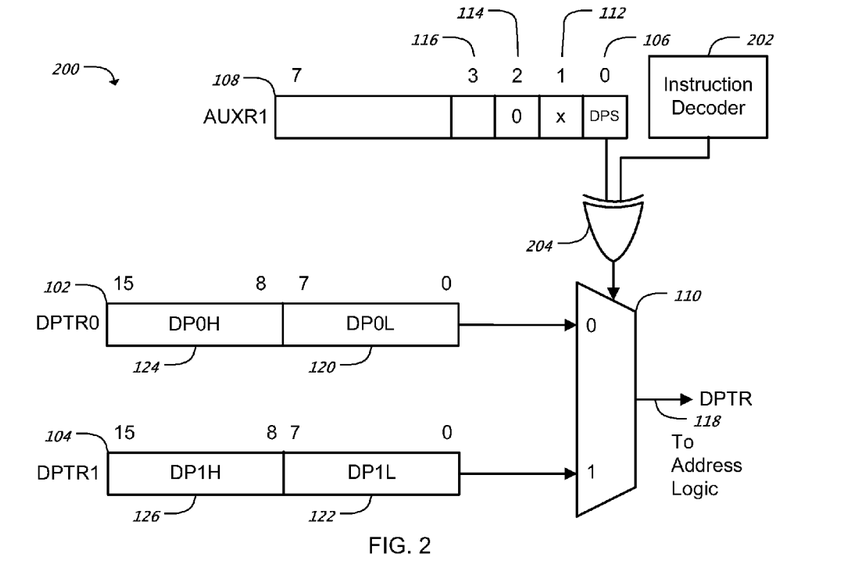
FIG. 2 illustrates an implementation of a device including a dual data pointer configuration with fast context switching.

FIG. 2 is a block diagram illustrating a device including an implementation of a dual data pointer configuration 200 that includes dual data pointers with fast context switching. The configuration 200 can perform in a substantially similar manner as the configuration 100, as described with reference to FIG. 1. In the example shown, however, additional circuitry provides fast context switching between the dual data pointer registers.

In some implementations, instruction level support for dual data pointers can be implemented with the addition of five extended instructions to the MCS-51 instruction set. These instructions can be implemented by prefixing existing DPTR mnemonic instructions with, for example, an "A5" hexadecimal-based escape code (A5h). An instruction decoder 202 can decode the instructions used in the configuration 200 to determine if an extended instruction is to be executed (i.e., determine if the instruction is prefixed with A5h). In some implementations, these extended instructions can use the mnemonic /DPTR. But any desired mnemonic can be used. Any instruction referencing the /DPTR mnemonic can use the opposite data pointer than currently specified by the control bit 106 (e.g., the inverted value of control bit 106 will be used instead of the non-inverted value).

A sixth data pointer instruction JMP @A+DPTR can deal with program flow, as opposed to data access, and is not used frequently with the toggling of the control bit 106. Therefore, the instruction prefixed by the "A5h" escape code is instead used as JMP @A+PC. This instruction can allow the use of localized jump tables for implementing case/switch constructs found in many high level programming languages (e.g., C and C++). The six extended instructions are shown in Table II below.

TABLE II

Extended Dual Data Pointer Instructions

| Data Pointer Instructions | Opcode |
| --- | --- |
| MOV /DPTR, #immediate 16 | A5 90h |
| INC /DPTR | A5 A3h |
| MOVC A, @A+/DPTR | A5 93h |
| MOVX A, @/DPTR | A5 E0h |
| MOVX @/DPTR, A | A5 F0h |
| JMP @A+PC | A5 73h |

In some implementations, an 8051-based microcontroller can include the six extended instructions shown in Table II in an MCS-51 instruction set that includes the use of the /DPTR mnemonic or equivalent mnemonic. For example, if the control bit 106 is equal to logic 0, and an instruction is executed which uses a DPTR mnemonic, the output of instruction decoder 202 is set equal to logic 0. The instruction decoder 202 then enables the logic value of the control bit 106 (i.e., logic 0) to the output of exclusive-OR gate 204, which is coupled to the input select of the switch 110. The switch 110 enables register 102 to be the active data pointer 118. In another example, if the control bit 106 is equal to logic 0, and an instruction is executed which uses a /DPTR mnemonic, the output of instruction decoder 202 is set equal to logic 1. The instruction decoder 202 then enables the inverted value of the control bit 106 (i.e., logic 1) to the output of exclusive-OR gate 204, which is coupled to the input select of the switch 110. The switch 110 enables the register 104 to be the active data pointer 118. In some implementations, the logic inversion of the control bit 106 to the switch 110 can occur for the duration of the execution of the /DPTR mnemonic instruction. Table III below illustrates the relationship between the mnemonic instructions DPTR, /DPTR, the control bit 106 and the active data pointer 118.

TABLE III

Relationship Between DPTR and /DPTR Mnemonics

| Mnemonic | DPTR when DPS = 0 | DPTR when DPS = 1 |
|---|---|---|
| DPTR | DPTR0 | DPTR1 |
| /DPTR | DPTR1 | DPTR0 |

In implementations that include the use of dual data pointers, where the data pointers are switched frequently, the use of the /DPTR mnemonic can result in less code and faster instruction execution times. This can occur due to the replacement of the two-byte based INC direct instruction with a /DPTR mnemonic instruction which is one byte less than the INC direct instruction. In some implementations, the INC direct instruction can be supported for backwards compatibility, and in implementations where the data pointer is not frequently toggled.

Below is an example of a block copy routine, written in assembly language code utilizing an MCS-51 based extended instruction set, which can be implemented using the dual data pointer configuration 200.

```
         MOV AUXR1, #0           ; initialize DPS
         MOV DPTR, #(source)     ; load source address
         MOV /DPTR, #(destination) ; load dest. address
         MOV R4, #block-size     ; # of bytes to copy
         CALL COPY               ; call copy routine
COPY:
         MOVX A, @DPTR           ; fetch byte from RAM
         INC DPTR                ; advance source pointer
         MOVX @/DPTR, A          ; store data to RAM
         INC /DPTR               ; advance dest. Pointer
         DJNZ R4, COPY           ; continue if not done
         RET                     ; else return
```

Previously described were three examples of assembly language code that can perform a block copy of data from, for example, one location in data memory to another. The first example used a single data pointer, the second example used dual data pointers and an increment instruction to switch data pointers, and the third example used dual data pointers, together with a new /DPTR mnemonic to affect fast context switching. Table IV below summarizes the number of bytes, and the number of microcontroller clock cycles that are used to implement a copy routine to copy a 64 byte block of data, one byte at a time. The copy routine is the assembly language code contained in the COPY loop of each of the above examples. It can be noted that the fewest number of bytes as well as the fewest number of clock cycles are used by the example where dual data pointers are used along with the /DPTR mnemonic.

TABLE IV

Performance Comparison

| Method | Number of Bytes | Number of Cycles |
|---|---|---|
| Single data pointer | 23 | 1732 |
| Dual data pointers using INC | 11 | 964 |
| Dual data pointers using /DPTR | 9 | 836 |

Multiple Data Pointers With Fast Context Switching

Figure 3:
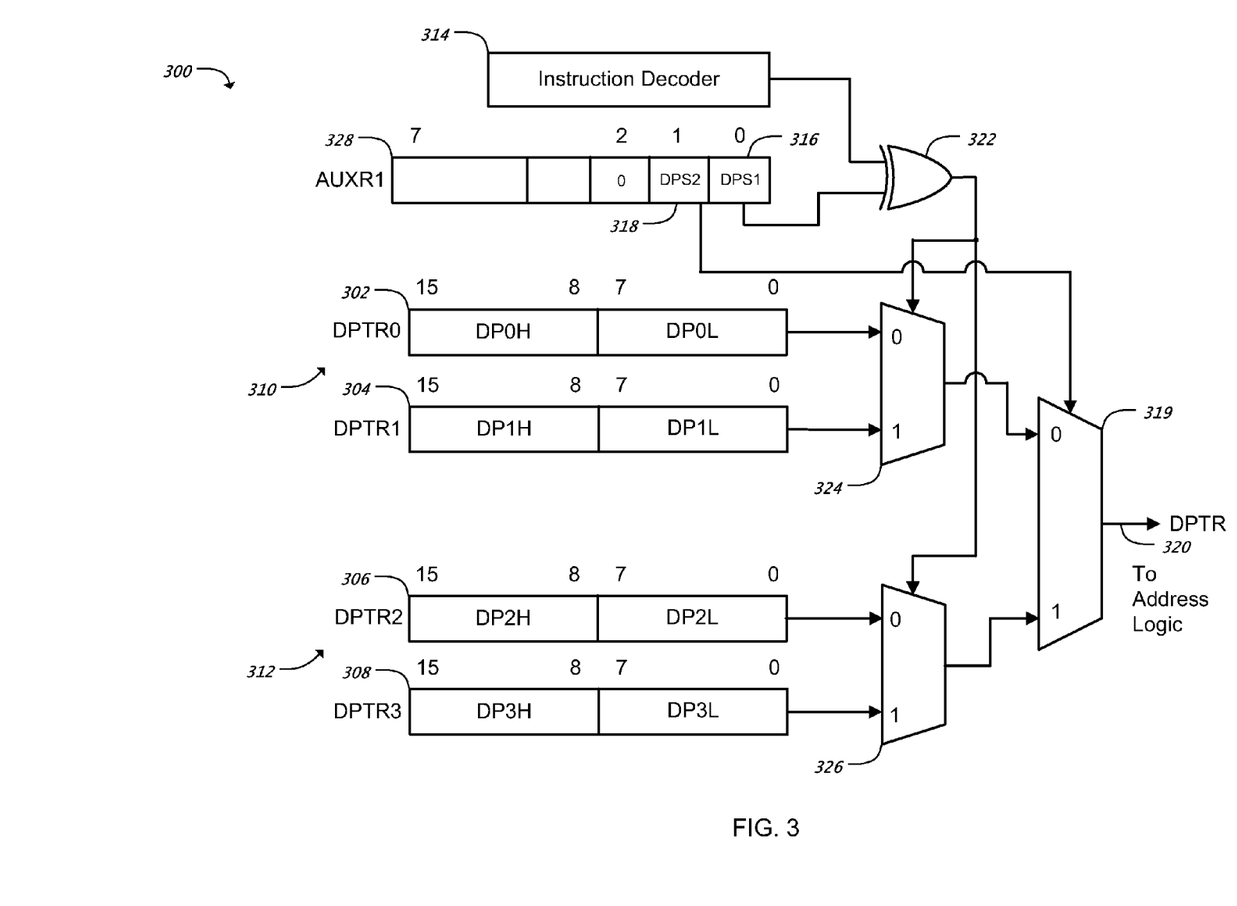
FIG. 3 illustrates an implementation of a device including a multiple data pointer configuration with fast context switching.

FIG. 3 is a block diagram illustrating a device including an implementation of a multiple data pointer configuration 300 that includes two pairs of data pointers with fast context switching. Each pair of data pointers and their associated control circuitry can perform in a substantially similar manner as the configuration 200 shown in FIG. 2. The configuration 300, however, includes additional circuitry for providing two pairs of data pointers with fast context switching.

In some implementations, the configuration 300 includes data pointer registers 302 (DPTR0), 304 (DPTR1), 306 (DPTR2), 308 (DPTR3), which can be grouped in pairs, where a first pair 310 includes registers 302 and 304, and a second pair 312 includes registers 306 and 308. A configuration register 328 (AUXR1) includes control bits 316 (DSP1) and 318 (DSP2) that can be used to control the selection of data pointer registers 302, 304, 306 and 308.

In some implementations, an instruction decoder 314 can decode the instructions used by the configuration 300 to determine if an extended instruction is to be executed (e.g., determine if the instruction is prefixed with A5h). These extended instructions can use the mnemonic /DPTR. The extended instruction, /DPTR, can control the switching of the individual data pointers in each pair. For the selected pair of data pointers, any instruction referencing /DPTR can use the opposite data pointer than currently specified by the control bits 316 and 318.

In some implementations, the control bit 318 is coupled to the input select of a switch 319. The control bit 318 can control whether or not the data pointer selected from the first pair 310 or the second pair 312 is output as the active pointer 320 (DPTR). For example, if the control bit 318 is equal to logic 0, a data pointer selected from the first pair 310 can be output as the active pointer 320. If the control bit 318 is equal to logic 1, a data pointer selected from the second pair 312 can be output as the active pointer 320.

If the control bits 316 and 318 are both equal to logic 0, a data pointer from the first pair 310 can be selected. If an instruction is then executed which uses the DPTR mnemonic, the output of instruction decoder 314 is set equal to logic 0. The instruction decoder 314 then enables the control bit 316 (i.e., logic 0) to the output of exclusive-OR gate 322, which is coupled to the input selects of the switches 324, 326. The switch 324 enables register 302 to the "0" input of the switch 319. The control bit 318 (i.e., logic 0) is coupled to the input select of the switch 319. The switch 319 enables register 302 to be output as the active pointer 320.

In another example, when the control bits 316 and 318 are both equal to logic 0, and an instruction is executed which uses the /DPTR mnemonic, the output of instruction decoder 314 is set equal to 1. The instruction decoder 314 then enables the inverted value of the control bit 316 (i.e., logic 1) to the output of exclusive-OR gate 322, which is coupled to the input selects of the switches 324, 326. The switch 324 enables register 304 to the "0" input of the switch 319. The control bit 318 (i.e., logic 0) is coupled to the input select of the switch 319. The switch 319 enables the register 304 to be output as the active data pointer 320.

In yet another example, if the control bit 318 is equal to logic 1 and the control bit 316 is equal to logic 0, a data pointer from the second pair 312 can be selected. If an instruction is then executed which uses the DPTR mnemonic, the output of instruction decoder 314 is set equal to logic 0. The instruction decoder 314 then enables the control bit 316 (i.e., logic 0) to the output of exclusive-OR gate 322, which is coupled to the input selects of the switches 324, 326. The switch 326 enables register 302 to the "1" input of the switch 319. The control bit 318 (i.e., logic 1) is coupled to the input select of the switch 319. The switch 319 enables register 306 to be output as the active data pointer 320.

In still another example, if the control bit 318 is equal to logic 1 and the control bit 316 is equal to logic 0, and an instruction is executed which uses a /DPTR mnemonic, the output of instruction decoder 314 is set equal to 1. The instruction decoder 314 then enables the inverted value of the control bit 316 (i.e., logic 1) to the output of exclusive-OR gate 322, which is coupled to the input selects of the switches 324, 326. The switch 326 enables register 308 to the "1" input of the switch 319. The control bit 318 (i.e., logic 1) is coupled to the input select of the switch 319. The switch 319 enables register 308 to be output as the active pointer 320.

In some implementations, the logic inversion of control bit 316 to the switches 324, 326, occurs for the duration of the execution of the /DPTR mnemonic instruction. Table V below illustrates the relationship between the mnemonic instructions DPTR, /DPTR, the control bits 316 and 318, and the active data pointer 320.

TABLE V

Logic Relationships For Configuration 300

| Mnemonic | DPTR when DPS 316 = 0 and DPS 318 = 0 | DPTR when DPS 316 = 1 and DPS 318 = 0 | DPTR when DPS 316 = 0 and DPS 318 = 1 | DPTR when DPS 316 = 1 and DPS 318 = 1 |
|---|---|---|---|---|
| DPTR | DPTR0 | DPTR1 | DPTR2 | DPTR3 |
| /DPTR | DPTR1 | DPTR0 | DPTR3 | DPTR2 |

The configuration 300 shown in FIG. 3 can be an improvement over configuration 100 when a large number of data pointers (e.g., number of data pointers greater than 2) are used. For example, using the configuration 300, which includes four data pointers, if the control bit 316 is equal to logic 1 and the control bit 318 is equal to logic 0 and register 304 is being referenced, register 302 can be referenced by using the /DPTR mnemonic without changing the values of the control bits 316 and 318.

In some implementations, the configuration 100 of FIG. 1 could be modified to use two control bits (e.g., control bit 106 and the second bit 112) to switch between four data pointers (e.g., DPTR0, DPTR1, DPTR2, DPTR3). Using the modified configuration 100 in the same example, if the control bit 106 is equal to logic 1 and the second bit 112 is equal to logic 0 and register 302 is being referenced, three increment (e.g., INC) instructions would be needed to cycle the two control bits (e.g., control bit 106 and second bit 112) to the value needed (control bit 106 equal to 0 and second bit 112 equal to 0) to access register 302. Therefore, the implementation of FIG. 3 for larger numbers of data pointers can involve fewer bytes and less CPU clock cycles than the modified configuration 100.

Although configuration 300 includes two pairs of data pointers, other implementations may include more than two pairs of data pointers by including additional data pointer registers and circuitry (e.g., additional decoding logic) for affecting fast context switching. For example, n:1 digital multiplexers can be used rather than 2:1 multiplexers.

Implementation Utilizing Dual Data Pointers with
Fast Context Switching

FIGS. 4A-4F are flow diagrams of an implementation of a method 400 that utilizes dual data pointers with fast context switching. In some implementations, the method 400 can be used with configuration 200, as described in reference to FIG. 2. The flow diagrams of FIGS. 4A-4F illustrate a method 400 for copying a byte of data from one location in data memory to another location in data memory utilizing dual data pointers with fast context switching.

The method 400 makes use of the extended dual data pointer instructions shown in Table II. The method 400 describes the implementation of an exemplary copy routine that copies a byte of data in memory from one memory location to another. The copy routine can include the following assembly language instructions:

```
; step 402
; initialize the data pointer configuration register
    MOV DPCF, #0
; step 404
; load the address, in memory, of the location of the data
; byte to be moved (the source address) into DPTR
    MOV DPTR, #(source)
; load the address of the location to move the data byte to
; (the destination address) into /DPTR
; step 406
    MOV /DPTR, #(destination)
; fetch the data byte from memory and put it into the accumulator
; load the value in the memory location pointed to by DPTR
; (the source pointer) into the accumulator
; step 408
    MOVX A, @DPTR
; advance the source pointer
; step 418
    INC DPTR
; store the data byte in the accumulator in memory
; load into the memory location pointed to by /DPTR
; (the destination pointer) the value in the accumulator
; step 436
    MOVX @/DPTR, A
; advance the destination pointer
; step 446
    INC /DPTR
```

The behavior of the dual data pointers in the copy routine shown above is affected by the values of bits in a configuration register.

Figure 4A:
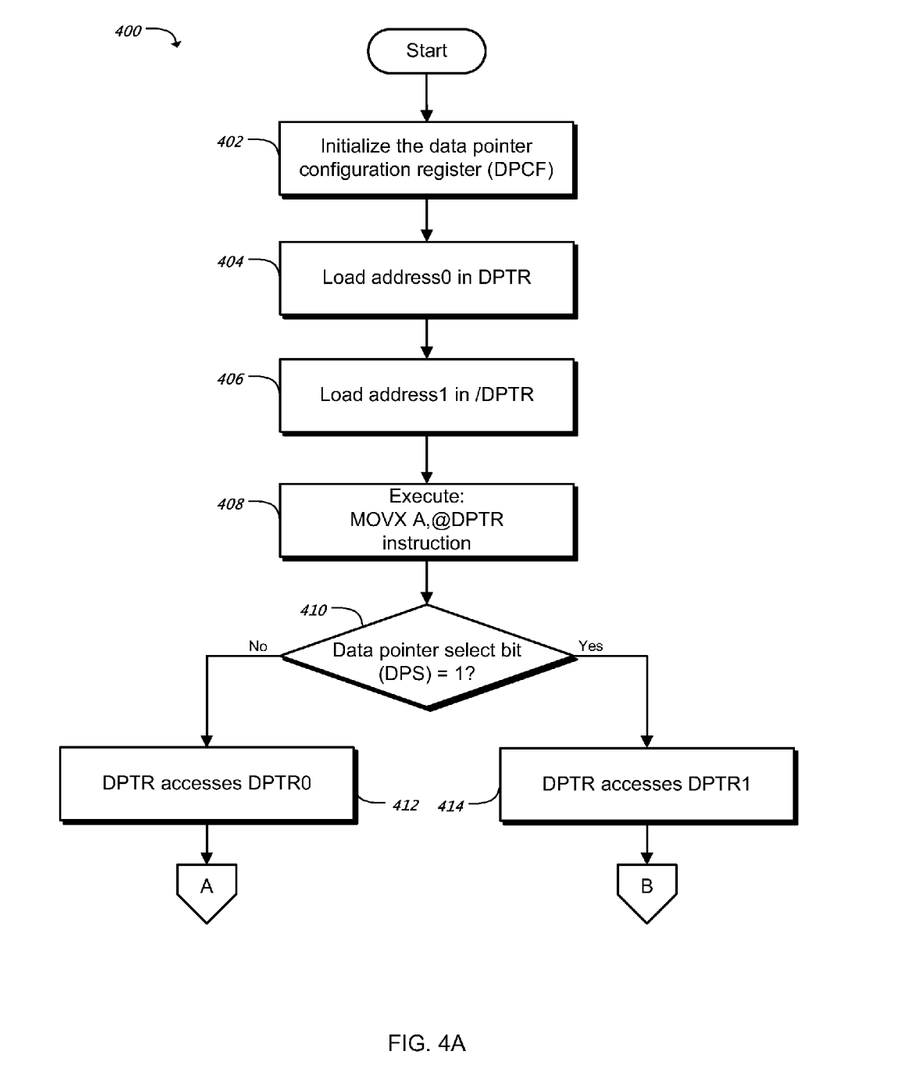
FIGS. 4A-4F are flow diagrams of an implementation of a method that utilizes dual data pointers with fast context switching.
Figure 4B:
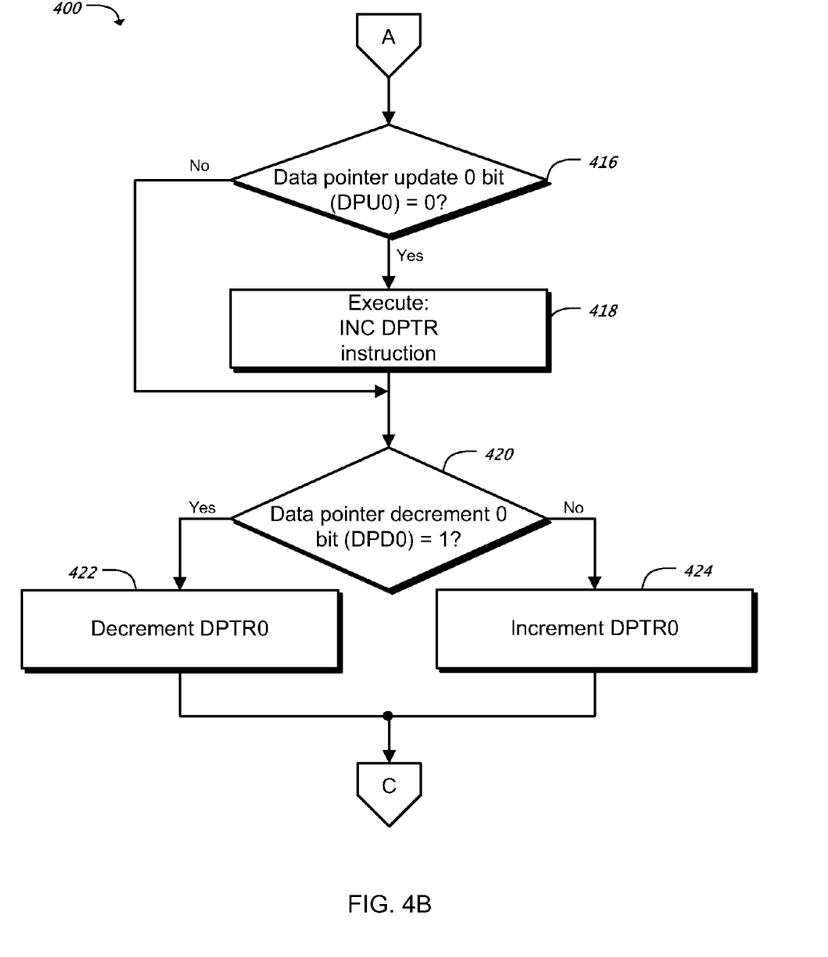
Figure 4C:
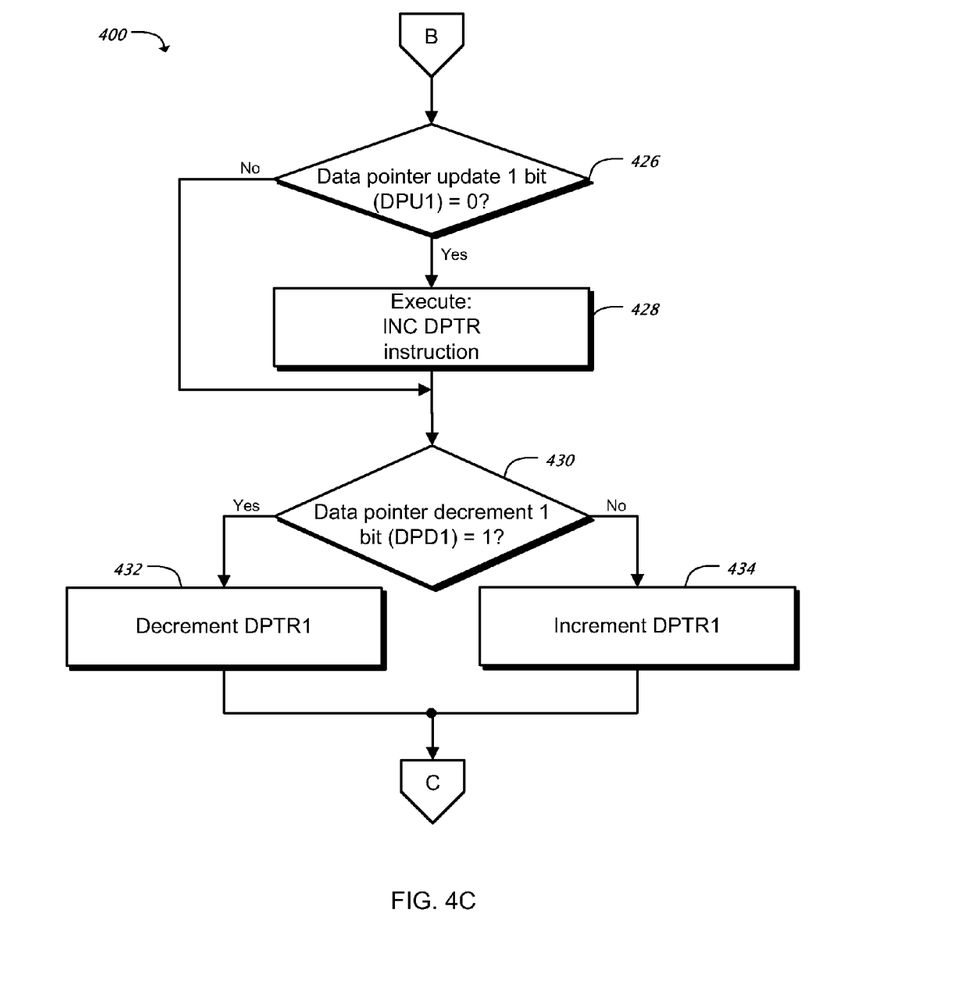
Figure 4D:
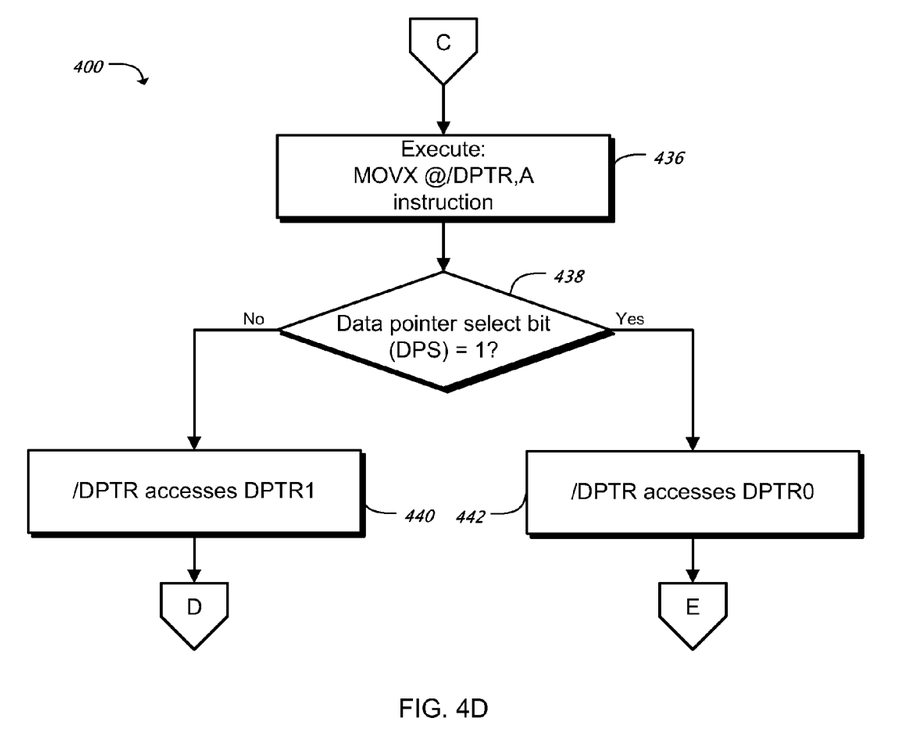
Figure 4E:
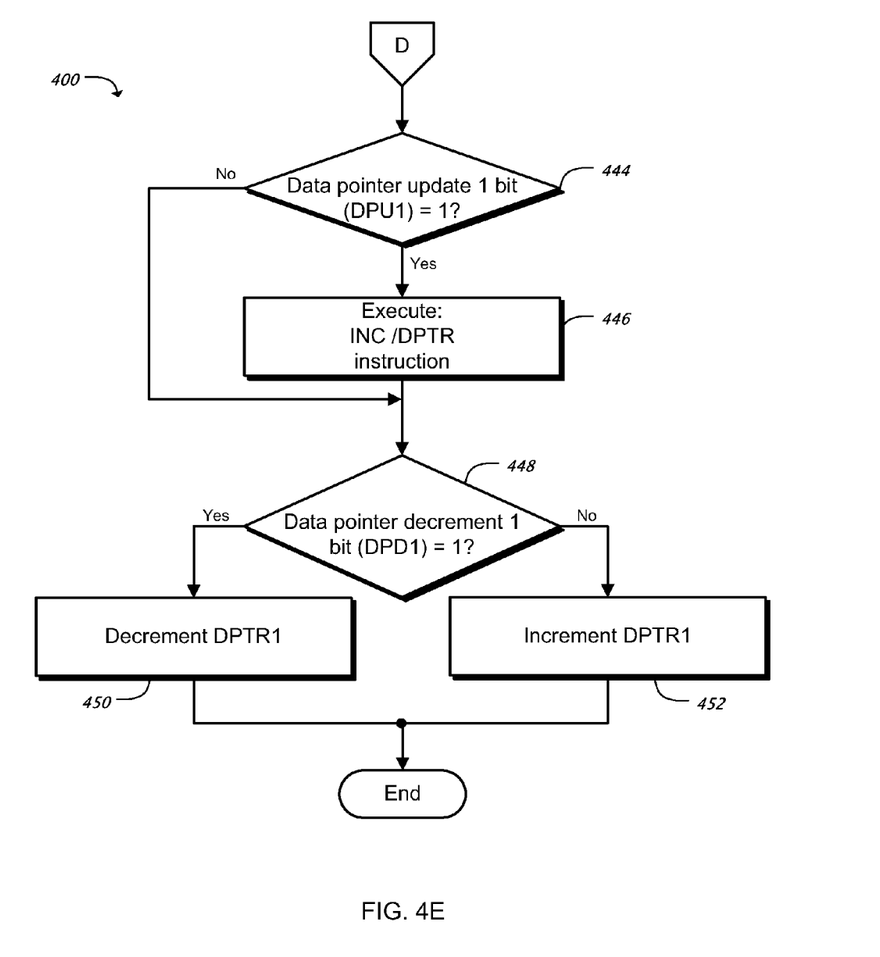
Figure 4F:
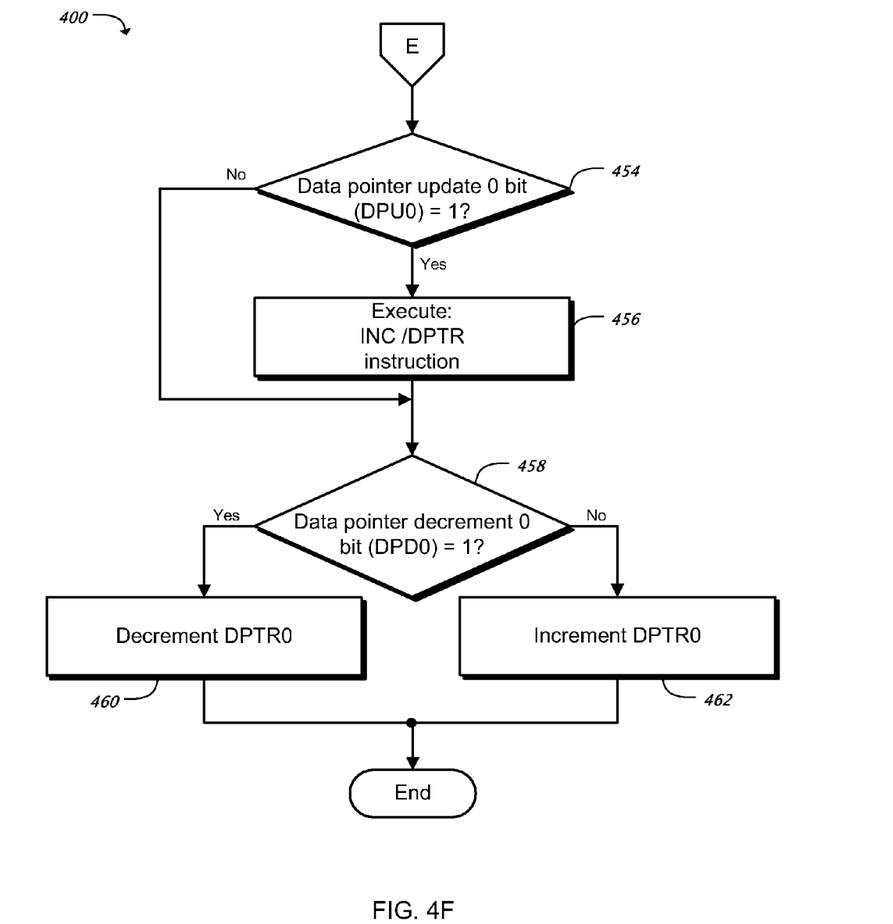
Figure 4G:
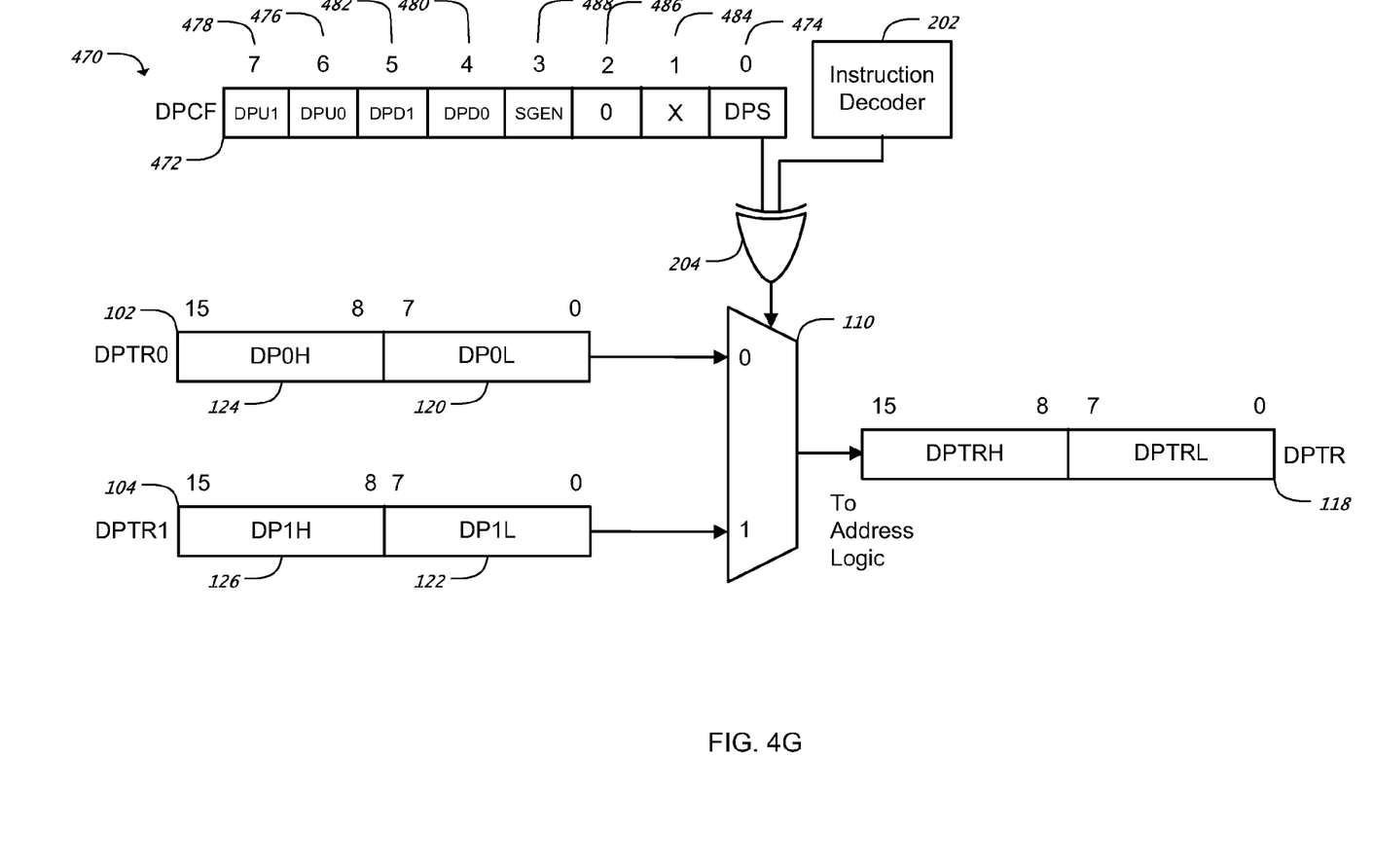
FIGS. 4G-4H illustrate an implementation of a device including a dual data pointer configuration with fast context switching that is configurable to implement the method of FIGS. 4A-4F.
Figure 4H:
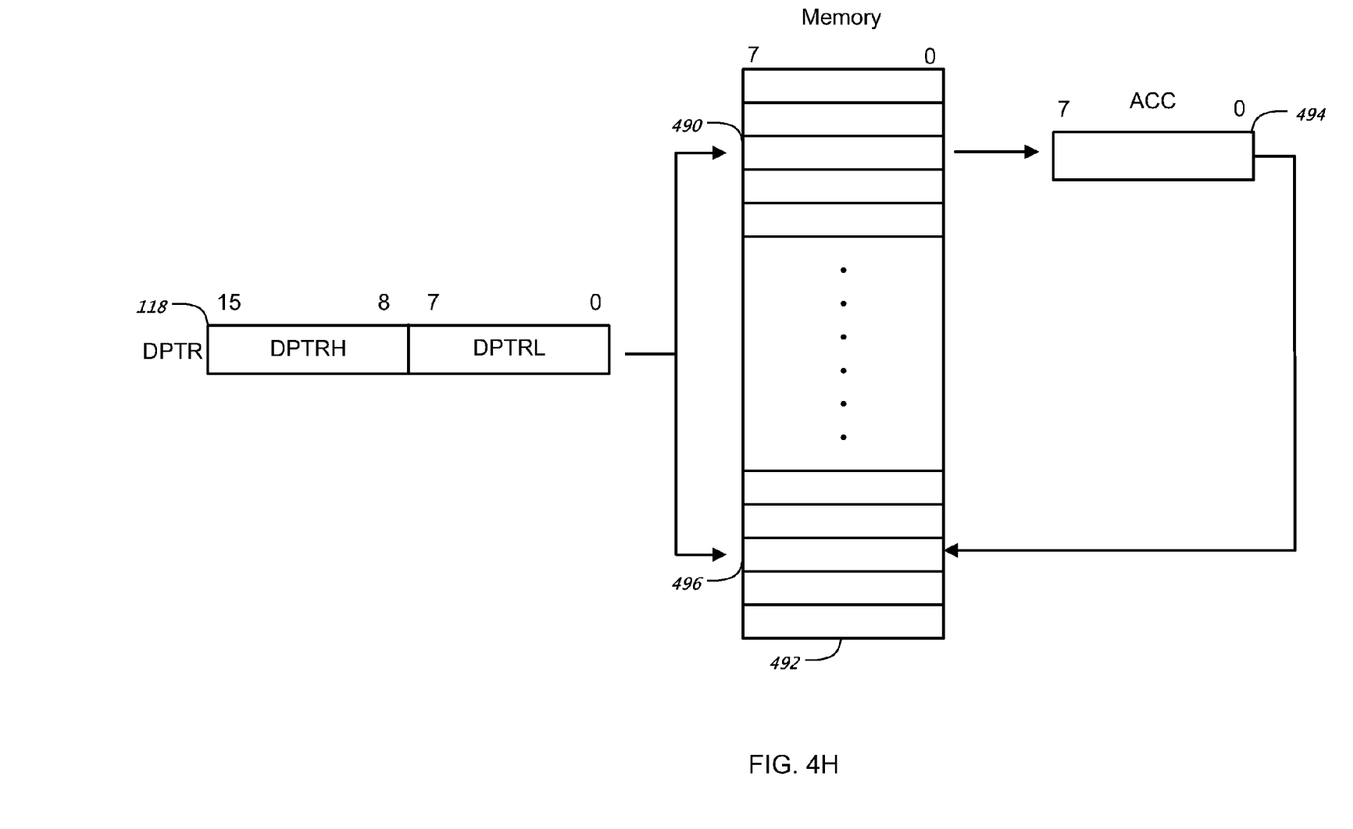

Referring now to FIG. 4A with reference to FIGS. 4H and 4G, in some implementations the method 400 begins with the initialization of the data pointer configuration register (DPCF) in step 402. The configuration register can be a special function register (SFR) included in a microcontroller (e.g., 8051 microcontroller) that can control the data pointers, DPTR0 and DPTR1. An example of the configuration register is data pointer configuration register 472, as described with reference to FIG. 4G.

During a copy block operation, a source address0 can be loaded into the data pointer register 472 accessed by the DPTR based mnemonic instruction in step 404. For example, the source address0 can be loaded into memory 492 at location 490, as shown in FIG. 4H. A target address1 can be loaded into the data pointer register accessed by the /DPTR based mnemonic instruction in step 406. For example, the target address1 can be loaded into memory 492 at location 496, as shown in FIG. 4H.

If DPS (control bit 474) is equal to logic 0, a DPTR instruction would access DPTR0 and a /DPTR instruction accesses DPTR1. In this case, address0 is loaded into DPTR0 and address1 is loaded into DPTR1. If DPS is equal to logic 1, a DPTR instruction would access DPTR1 and a /DPTR instruction accesses DPTR0. In this case, address0 is loaded into DPTR1 and address1 is loaded into DPTR0.

A MOVX A, @DPTR instruction is executed in step 408. This instruction moves the contents of the address in memory pointed to by DPTR (location 490 in memory 492) into an accumulator, A, for example, accumulator 494. This is shown with reference to FIG. 4H. If DPS (control bit 474) is equal to logic 0, in step 410, then a DPTR instruction accesses DPTR0, in step 412, and the contents of the address in memory pointed to by DPTR0 is loaded into the accumulator, A. The method continues to step 416 in FIG. 4B. If DPS is equal to logic 1 (not equal to logic 0), in step 410, then a DPTR instruction accesses DPTR1, in step 414, and the contents of the address in memory pointed to by DPTR1 is loaded into the accumulator, A. The method continues to step 426 in FIG. 4C.

As shown in FIG. 4B, data pointer update 0 bit (control bit 476 (DPU0)) for register DPTR0 is checked. When DPU0 is equal to logic 1, MOVX @DPTR and MOVC @DPTR instructions that use DPTR0 will update DPTR0 based on the value of the data pointer decrement bit (control bit 480 (DPD0)). If DPD0 is equal to 1, the operation is post-increment. If DPD0 is equal to 0, the operation is post-decrement. When DPU0 is equal to logic 0, DPTR0 is not updated and an increment instruction can be executed to update DPTR0.

If DPU0 is equal to logic 0, in step 416, an increment instruction (e.g., INC) is executed in step 418. If DPU0 is equal to logic 1 (not equal to logic 0), in step 416, an increment instruction is not executed. If, in step 420, DPD0 is equal to logic 1, the value of DPTR0 is decremented in step 422. If, in step 420, DPD0 is equal to logic 0 (not equal to logic 1), the value of DPTR0 is incremented in step 424. As shown in FIG. 4B, if the data pointer update register (e.g., DPU0) is not set equal to 1, the data pointer (e.g., DPTR0) will not auto-update and an increment instruction can be performed to update the data pointer. The method continues to step 436, in FIG. 4D.

As shown in FIG. 4C, data pointer update 1 bit (control bit 478 (DPU1)) for DPTR1 is checked. When DPU1 is equal to logic 1, MOVX @DPTR and MOVC @DPTR instructions that use DPTR1 will update DPTR1 based on the value of the data pointer decrement bit (control bit 482 (DPD1)). If DPD1 is equal to 1, the operation is post-increment. If DPD1 is equal to 0, the operation is post-decrement. When DPU1 is equal to logic 0, DPTR1 is not updated and an increment instruction can be executed to update DPTR1.

If DPU1 is equal to logic 0, in step 426, an increment instruction (e.g., INC) is executed in step 428. If DPU1 is equal to logic 1 (not equal to logic 0), in step 426, an increment instruction is not executed. If, in step 430, DPD1 is equal to logic 1, the value of DPTR1 is decremented in step 432. If, in step 430, DPD1 is equal to logic 0 (not equal to logic 1), the value of DPTR1 is incremented in step 434. As shown in FIG. 4C, if the data pointer update register (e.g., DPU1) is not set equal to 1, the data pointer (e.g., DPTR1) will not auto-update and an increment instruction is performed to update the data pointer.

In FIG. 4D, a MOVX @/DPTR, A instruction is executed in step 436. The instruction moves the contents of the accumulator A, for example accumulator 494, into the memory location pointed to by /DPTR (location 496 in memory 492). If DPS (control bit 474) is equal to logic 0, in step 438, then a /DPTR instruction accesses DPTR1, in step 440. The accumulator, A, is loaded into the memory location DPTR1 points to. The method continues to step 444 in FIG. 4E. If DPS is equal to logic 1 (not equal to logic 0), in step 438, then a /DPTR instruction accesses DPTR0, in step 442. The accumulator, A, is loaded into the memory location DPTR0 points to. The method continues to step 454 in FIG. 4F.

As shown in FIG. 4E, a data pointer update 1 bit (control bit 478 (DPU1)) for DPTR1 is checked. If DPU1 is equal to logic 0, in step 444, an increment instruction (e.g., INC) is executed in step 446. If DPU1 is equal to logic 1 (not equal to logic 0), in step 444, an increment instruction is not executed. If, in step 448, DPD1 is equal to logic 1, the value of DPTR1 is decremented in step 450. If, in step 448, DPD1 is equal to logic 0 (not equal to logic 1), the value of DPTR1 is incremented in step 454. As shown in FIG. 4E, if the data pointer update register (e.g., DPU1) is not set equal to 1, the data pointer (e.g., DPTR1) will not auto-update and an increment instruction is performed to update the data pointer. Thereafter, the method 400 ends.

As shown in FIG. 4F, data pointer update 0 bit (control bit 476 (DPU0)) for DPTR0 is checked. If DPU0 is equal to logic 0, in step 454, an increment instruction (e.g., INC) is executed in step 456. If DPU1 is equal to logic 1 (not equal to logic 0), in step 454, an increment instruction is not executed. If, in step 458, DPD0 is equal to logic 1, the value of DPTR1 is decremented in step 460. If, in step 458, DPD1 is equal to logic 0 (not equal to logic 1), the value of DPTR1 is incremented in step 462. As shown in FIG. 4F, if the data pointer update register (e.g., DPU1) is not set equal to 1, the data pointer (e.g., DPTR1) will not auto-update and an increment instruction is performed to update the data pointer. The method 400 ends.

FIGS. 4G-4H illustrate an implementation of a dual data pointer configuration 470 with fast context switching for the method 400 of FIGS. 4A-4F. The configuration 470 can perform in a substantially similar manner as the configuration 200, as described with reference to FIG. 2. In the example shown, additional registers and memory are included to illustrate the method 400 of FIGS. 4A-4F.

In some implementations, the configuration 470 can be included in a central processing unit (CPU) of an 8051-based microcontroller that utilizes the MCS-51 instruction set. In the example shown, a data pointer configuration register 472 (DPCF) is included in configuration 470. For example, the configuration register 472 can be implemented as an auxiliary register of an 8051-based microcontroller.

The configuration register 472 can be implemented as an 8-bit register that can include control bits to select the active data pointer register and control bits for enabling data pointer register decrementing and auto-update. For example, control bit 476 (DPU0), and control bit 478 (DPU1) can be included for automatically updating a data pointer after a data pointer instruction has been executed. Likewise, control bits for decrementing data pointer registers, control bit 480 (DPD0) and control bit 482 (DPD1) can also be included in the configuration register 472. The data pointer decrement control bits 480, 482 can control if an increment instruction increments or decrements the associated data pointer. Also included in the configuration register 372 is the data pointer select (DPS) control bit 474. The data pointer select control bit 474, along with the output of instruction decoder 202, can select the active data pointer 118 (e.g., DPTR0 102, DPTR1 104) for instructions that reference the data pointer. Table III illustrates the relationship between the mnemonic instructions DPTR, /DPTR, the data pointer select control bit 474 and the active data pointer 118. An implementation of a control bit and instruction decoder was also described with reference to FIG. 1 and FIG. 2.

The configuration register 472 also can include second bit 484 and third bit 486. As described with reference to FIG. 1, a 2-byte INC instruction targeting configuration register 472 toggles the control bit 474 by incrementing the configuration register 472 when a switch between registers 102 and 104 is required. To facilitate the toggling, the control bit 474 can be the least significant bit of the configuration register 472, and in the example shown, the second bit 112 is not used (a "don't care") and the third bit 114 is hard wired to logic 0. Each increment instruction will toggle the control bit 474 and any carry out bits can be blocked by the hard-wiring of third bit 486 to logic 0 leaving the upper bits of the configuration register 472 unaffected.

Control bit 488 (SGEN) in configuration register 472 can be included to determine when the instruction MOVC A, @A+DPTR will read from the signature array. When SGEN is set (equal to logic 1), the instruction will read from the signature array. When SGEN is cleared (equal to logic 0) the instruction will read from the program memory.

Configuration 470 can include instruction level support for dual data pointers as was described with reference to FIG. 1 and FIG. 2. The extended instructions for the dual data pointers make use of the /DPTR mnemonic. An instruction decoder 202 can decode the instructions used in the configuration 470 to determine if an extended instruction is to be executed. Any instruction referencing the /DPTR mnemonic can use the opposite data pointer than currently specified by control bit 474 of configuration register 472 (e.g., the inverted value of control bit 474 will be used instead of the non-inverted value).

For example, the active data pointer 118 is selected by configuration 470, as was described with reference to FIG. 2. Once selected, the active data pointer 118 can point to a location 490 in memory 492. The memory 492 can, for example, be a 64K block of random access memory (RAM), organized and addressable in bytes, that can be included in an 8051-based microcontroller.

When the instruction MOVX A,@DPTR is executed, the location 490 in memory 492 pointed to by active data pointer 118 can be loaded into the accumulator 494 (ACC). The value in the accumulator can be acted upon by other program instructions and the active data pointer 118 can be updated.

When the instruction MOVX @DPTR, A is executed, the updated value in the accumulator 494 can be stored into memory 492 at the location 496 pointed to by the active data pointer 118.

Example Microcontroller System

Figure 5:
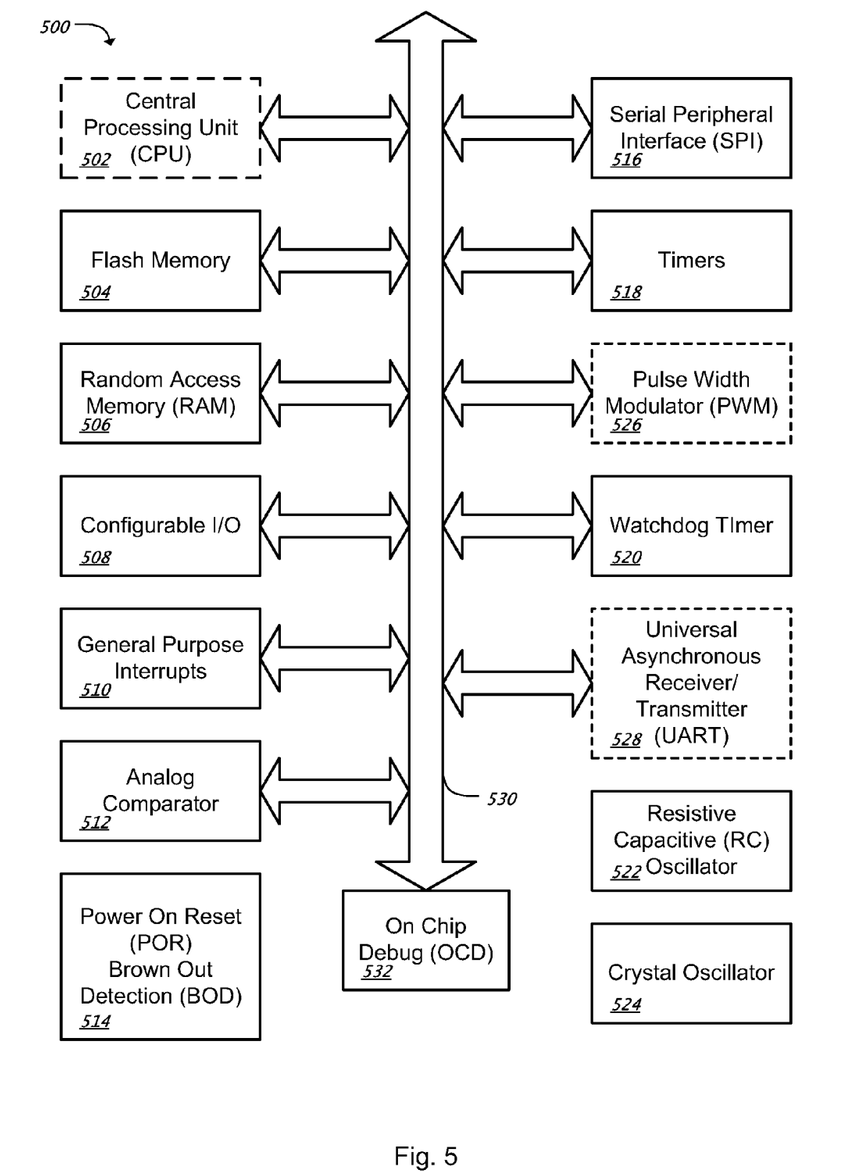
FIG. 5 is a block diagram of an implementation of a microcontroller system including a CPU that implements dual data pointers with fast context switching.

FIG. 5 is a block diagram of an implementation of a microcontroller system 500 including a CPU 502 that implements dual data pointers with fast context switching. The system 500 also includes flash memory 504, random access memory (RAM) 506, configurable input/output (I/O) 508, general purpose interrupts 510, analog comparator 512, power on reset (POR) brown out detection (BOD) 514, serial peripheral interface (SPI) 516, timers 518, watchdog timer 520, resistive capacitive (RC) oscillator 522, crystal oscillator 524, and on chip debug 532. The system can also optionally include pulse width modulator (PWM) 526, and universal asynchronous receiver/transmitter (UART) 528.

The system 500 also includes bus 530. Each of the components of system 500 interface to bus 530. The bus 530 can allow the components of the microcontroller system 500 to communicate with one another, allowing information and data to be passed among the components.

In some implementations, the microcontroller of FIG. 5 can be a single-cycle 8051-based microcontroller. The 8051-based microcontroller can be programmed using an MCS-51 based extended instruction set, as was previously described.

The CPU 502 can include the circuitry necessary to interpret and execute program instructions, as well as interpret data, for the system 500. The CPU 502 can include the configurations 100, 200, and 300 as described with reference to FIGS. 1-3, respectively.

The flash memory 504 is a form of non-volatile computer memory that can be electrically erased and reprogrammed in large blocks. The flash memory 504 can contain the program code used by the CPU 502 to control the system 500. In some implementations, flash memory can include 2K bytes of non-volatile, solid-state storage for use by the system 500. In other implementations, flash memory can include 4K bytes of non-volatile, solid-state storage for use by the system 500.

The RAM 506 is a form of volatile computer memory that can be accessed randomly. The RAM 506 can be written to and read from, for example, one byte at a time. It can be used by the system 500 as a working area for loading and manipulating applications and data used by the CPU 502 as well as other components of the system 500. In some implementations, RAM 504 can include 128 bytes of volatile memory.

Configurable I/O 508 are interfaces that the system 500 can use to communicate with other systems outside of the microcontroller system 500. The interfaces can include information processing as well as signal information to be sent by the interfaces. Inputs are signals received by the system 500 and outputs signals are sent from the system 500. Each interface can be referred to as a "port". In some implementations, each port can be individually configured to be either an input or an output port. In some implementations, a port can be configured to be an input-only port, a full complementary metal-oxide-semiconductor (CMOS) output port, an open-drain output port, or a quasi-bidirectional (both input and output) port.

Interrupts can be hardware generated asynchronous signals indicating the need for attention. Interrupts can also be software generated synchronous signals indicating a need for attention to initiate a change in program execution. General purpose interrupts 510 can be configured to perform either hardware or software interrupts.

Various modifications may be made to the disclosed implementations and still be within the scope of the following claims.

What is claimed is:

1. A device comprising:
a first data pointer register operable for storing a first data pointer;
a second data pointer register operable for storing a second data pointer;
a switch coupled to the first data pointer register and the second data pointer register, the switch operable for selecting either the first data pointer or the second data pointer as an active data pointer;
a configuration register operable for providing a first signal indicating which one of the first data pointer or the second data pointer is the active data pointer;
an instruction decoder operable for receiving a data pointer instruction and outputting, based on the data pointer instruction, a second signal indicating which one of the first data pointer or the second data pointer is the active data pointer; and
a decoding logic circuit coupling the configuration register, the instruction decoder, and the switch, the decoding logic circuit being configured to use the first signal from the configuration register as a first input and the second signal from the instruction decoder as a second input, and to produce an output signal to the switch, wherein during execution of the data pointer instruction, when the first signal from the configuration register indicates that the first data pointer is the active data pointer, the switch selects the second data pointer as the active data pointer based on the output signal from the decoding logic circuit.

2. The device of claim 1, further comprising:
an address logic circuit coupled to the decoding logic circuit and operable to receive the active data pointer for use in addressing memory.

3. The device of claim 1, wherein: the decoding logic circuit comprises
one or more logic gates; and
the switch is operable for outputting the active data pointer in response to the output signal provided by the one or more logic gates.

4. The device of claim 1, wherein the data pointer instruction includes a prefix, which, when detected by the instruction decoder, causes the second signal to be output from the instruction decoder.

5. The device of claim 4, wherein the prefix is an escape code.

6. The device of claim 5, wherein the escape code is A5 hexadecimal.

7. The device of claim 1, wherein the device is an 8051-based microcontroller utilizing an MCS-51 instruction set.

8. The device of claim 1, wherein the decoding logic circuit includes an exclusive-or gate.

9. A method for controlling data pointers in a device, comprising:
storing a first data pointer in a first data pointer register;
storing a second data pointer in a second data pointer register;
providing, by a configuration register, a first signal specifying either the first data pointer or the second data pointer as an active data pointer;
providing, by an instruction decoder, a second signal in response to detection of a type of a data pointer instruction, the second signal specifying either the first data pointer or the second data pointer as the active data pointer;
receiving, by a decoding logic circuit coupled to the configuration register, the instruction decoder, and a switch operable for selecting either the first data pointer or the second data pointer as the active data pointer, the first signal and the second signal as inputs;
generating, based on the first signal and the second signal and by the decoding logic circuit, an output signal for controlling the switch; and
selecting, during execution of the data pointer instruction and by the switch, the first data pointer as the active data pointer in response to the output signal generated by the decoding logic circuit, when the first signal from the configuration register indicates that the second data pointer is the active data pointer.

10. The method of claim 9, wherein providing the second signal comprises:
detecting a prefix in the data pointer instruction; and
generating the second signal in response to the detected prefix.

11. The method of claim 9, further comprising:
receiving, by an address logic circuit coupled to the decoding logic circuit, the active data pointer for use in addressing memory.

12. The method of claim 9, wherein the decoding logic circuit comprises
one or more logic gates, the method comprising outputting the active data pointer in response to the output signal provided by the one or more logic gates.

13. The method of claim 9, wherein the data pointer instruction includes a prefix, which, when detected by the instruction decoder, causes the second signal to be output from the instruction decoder.

14. The method of claim 13, wherein the prefix is an escape code.

15. The method of claim 14, wherein the escape code is A5 hexadecimal.

16. The method of claim 9, wherein the device is an 8051-based microcontroller utilizing an MCS-51 instruction set.

17. The method of claim 9, wherein the decoding logic circuit includes an exclusive-or gate.

* * * * *